United States Patent [19]

Milbourn

[11] 3,971,064
[45] July 20, 1976

[54] VIDEO DE-PEAKING CIRCUIT IN LUMINANCE CHANNEL IN RESPONSE TO AGC SIGNAL

[75] Inventor: Edward Marshall Milbourn, Greenfield, Ind.

[73] Assignee: RCA Corporation, New York, N.Y.

[22] Filed: Jan. 21, 1974

[21] Appl. No.: 434,950

Related U.S. Application Data

[63] Continuation of Ser. No. 115,304, Feb. 16, 1971, abandoned.

[52] U.S. Cl. .................................. 358/38; 358/39; 178/DIG. 19
[51] Int. Cl.² ........................................... H04N 9/00
[58] Field of Search ..................... 358/37, 38, 39; 178/7.3 R, 7.5 R, DIG. 19

[56] References Cited
UNITED STATES PATENTS

| | | |
|---|---|---|
| 2,514,112 | 7/1950 | Wright et al. .................. 178/DIG. 19 |
| 2,584,332 | 2/1952 | Crooker et al. ................ 178/DIG. 19 |
| 2,717,931 | 9/1955 | Duke ............................ 178/DIG. 19 |
| 2,910,528 | 10/1959 | Petersen ............................ 358/38 |
| 3,231,822 | 1/1966 | Tillotson ............................ 325/400 |
| 3,368,157 | 2/1968 | Fumea, Jr. et al. ........... 178/DIG. 19 |
| 3,706,846 | 12/1972 | Siwko ............................... 178/7.3 R |

Primary Examiner—Robert L. Griffin
Assistant Examiner—George G. Stellar
Attorney, Agent, or Firm—E. M. Whitacre; P. M. Emanuel

[57] ABSTRACT

The same AGC voltage as is developed in a television receiver to control the gain of its signal translating stages is additionally utilized by the described circuit to automatically de-peak its video response during the reception of relatively weak signals. The video response is automatically returned to its normal peaked condition during the reception of stronger signals—again, under control of the AGC voltage.

2 Claims, 3 Drawing Figures

INVENTOR.
EDWARD M. MILBOURN

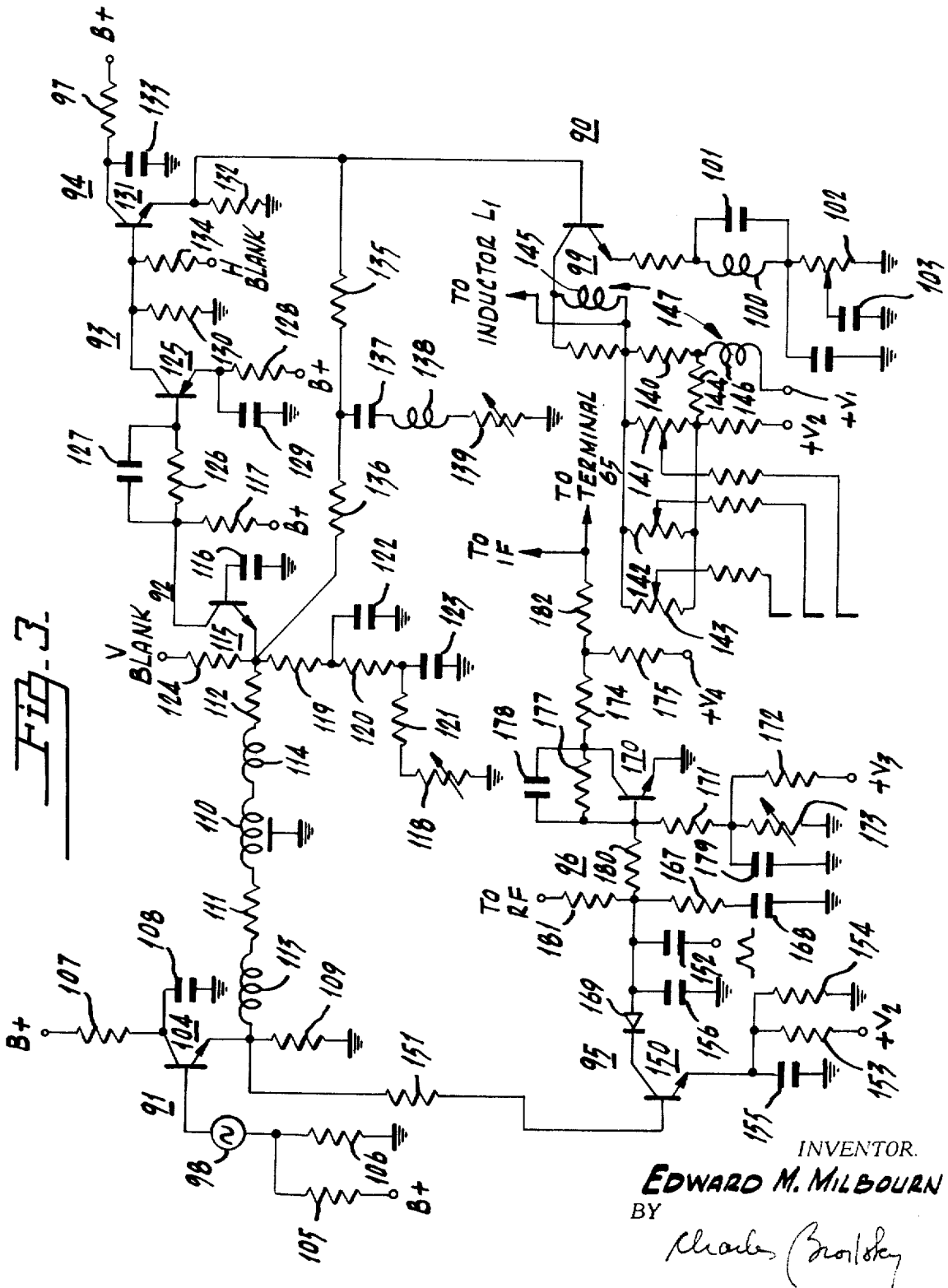

VIDEO DE-PEAKING CIRCUIT IN LUMINANCE CHANNEL IN RESPONSE TO AGC SIGNAL

This is a continuation of application Ser. No. 115,304, filed Feb. 16, 1971, now abandoned.

BACKGROUND OF THE INVENTION

1. Field of the Invention

This invention relates to television receivers, in general, and to a high frequency de-peaking circuit for the video amplifier output stages thereof, in particular.

2. Description of the Prior Art

The use of video peaking circuits in television receivers to accentuate the high video frequencies is well known in the prior art. Typical of such circuits are those disclosed in U.S. Pat. Nos. 3,320,361 — Stroh, 3,340,357 — Williams and 3,394,319 — Heuer. Each of these patents points out the further desirability of providing an adjustable control in the peaking circuit to allow the viewer to vary the band-pass receiver characteristic so as to optimize the reproduced picture in the presence of weak signals. Since the signal-to-noise ratio may be sufficiently poor under such signal conditions as to introduce "snow" into the image, adjustment of the control to de-emphasize the accentuated higher video frequencies of the signal is employed to "smear" the noise, as most of its components are at those higher frequencies. When the signal transmissions are good, however, the control is adjusted to translate the accentuated high-frequency video content intact, so that the high quality signal may preferably be reproduced in its full detail. While it has been recognized that such picture optimization can be had to some extent through adjustment of the receiver's fine tuning control (see U.S. Pat. No. 3,487,165 — Anderson), it is now recognized that such de-tuning may result in the loss of color information during color reception—and may change the sound reproduction of the receiver, as well.

With the advent of such color television transmission and receiving systems as are capable of presenting an extremely high resolution color display, this problem of increasing visibility of video noise becomes more significant. Thus, as noted in these patent disclosures, television set manufacturers have provided the viewer with manually operated "sharpness" or "crispness" controls to permit an adjustment to be made in the video frequency response as will produce a more pleasing image in accordance with his individual taste.

However, characteristic of each of these controls is the need for the viewer to continually re-adjust its setting each time he changes the channel selector, else the visual presentations will not be optimum for each channel to which he tunes. This follows from signal variations which occur with different studio operations, with different transmitter adjustments, with over-the-air transmission paths which differ, and with differences in the quality of the televised information—for example, old movies as compared to live performances. Besides being thus disadvantageous from the standpoint of requiring the viewer to continuously re-adjust his sharpness control to maintain an optimum picture, such approaches are disadvantageous in that the viewer will many times forget to reset the control and will, therefore, lose the performance which just such a control is intended to provide. Perhaps more important is the fact that this arrangement provides the viewer with a control whose function he may not fully appreciate, and is in a direction away from the goal of having as many adjustments done automatically, in order to simplify matters for the purchasing customer.

SUMMARY OF THE INVENTION

As will become clear hereinafter, the circuit of the present invention operates to automatically provide controlled de-peaking of the video response both during the reception of relatively weak signals as well as during the reception of stronger signals. In particular, it will be seen that the disclosed arrangement utilizes the same AGC voltage developed within the receiver to control the gain of its signal translating stages to additionally and increasingly de-peak the accentuated higher frequency components of the luminance signals as the received signal strength decreases. As the signal strength increases, on the other hand, the degree of de-peaking of these frequencies decrease. As will be seen below, the circuit operates as a variable resistance which controls the impedance of the ground return of a separate de-peaking circuit to counteract the operation of an applicable type of peaking circuit which accentuates the high frequency components of the luminance signals for all signal strengths.

BRIEF DESCRIPTION OF THE DRAWINGS

These and other advantages of the present invention will be more clearly understood from a consideration of the following description taken in connection with the accompanying drawings in which:

FIG. 3 is a simplified schematic diagram of a portion of a color television receiver in which the video de-peaking circuit of the invention has been found to satisfactorily operate.

DETAILED DESCRIPTION OF THE DRAWINGS

Figure 1:
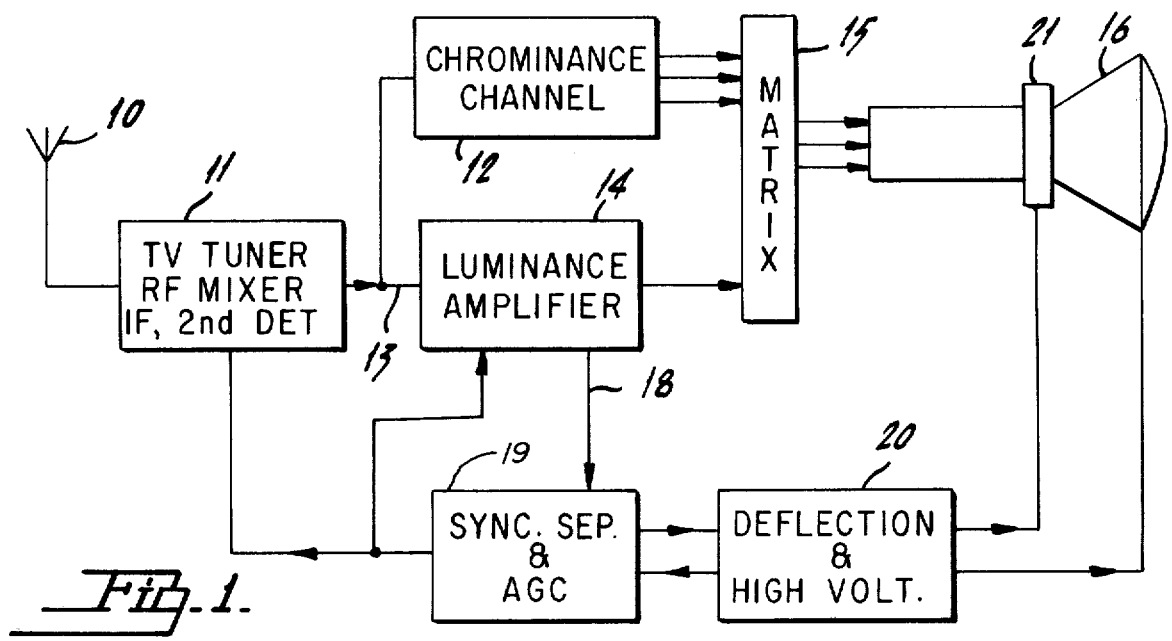
FIG. 1 illustrates, by way of a block diagram, a color television signal receiving system in which the video peaking control circuit of the present invention is applicable.

Referring to FIG. 1 of the drawings, there is shown a color television receiver of well known form in which information regarding the luminance of a televised scene is transmitted by a luminance signal which is an amplitude modulation of a main carrier wave with video signals proportional to the elemental brightness values of the scene. Information regarding the color of the televised scene is transmitted by a chrominance signal constituting a phase and amplitude-modulated subcarrier wave in which the instantaneous phase of the subcarrier with respect to a color reference phase is indicative of a selected hue while the instantaneous amplitude of the wave is proportional to the degree of saturation of the hue.

The antenna 10, in this apparatus, is adapted to intercept the television signal and to apply it to the input terminals of a television tuner section 11 which may be understood as including the usual radio-frequency (RF), mixer, intermediate-frequency (IF) and second detector stages. Understanding that this is but a simplified showing of the interaction of the various portions of the color television receiving system, the detected signal information is applied simultaneously to a chrominance channel 12 and by means of a conductor 13 to a luminance signal amplifier 14. Color difference signals are derived from the chrominance subcarrier wave and applied along with the amplified luminance signal to a matrix 15 which is adapted to combine these signals in such a manner as to provide color signals which may be applied to an image reproducing device or kinescope 16.

Signals which may or may not be of the same polarity as that applied to the matrix 15 are also derived from the load circuit of the luminance amplifier 14 and applied via a conductor 18 to a sync separator and automatic gain control (AGC) circuit 19 of the receiving system. The synchronizing signals are utilized to synchronize the deflection apparatus 20 of the receiving system with that of the transmitting system while the deflection and high voltage apparatus 20 is connected to the deflection yoke 21 of the kinescope in order to provide a rectangular scanning raster on its face. The high voltage which is developed in the deflection and high voltage apparatus 20 is also applied to the kinescope 16 in order to provide electron beam acceleration.

The AGC system utilized in the particular color television receiver envisioned in FIG. 1 may be of the keyed variety. With this type of AGC system, a fly-back pulse is applied from the deflection and high voltage apparatus 20 to the sync separator and AGC unit 19 to establish, in cooperation with signals received from the luminance signal amplifier 14, an AGC voltage which is representative of the level of the received signal. The AGC voltage thus developed is applied to one or more of the signal translating stages of the receiving system in tuner section 11 in order to control the gain of its stages as an inverse function of the amplitude of the received signal.

As thus far described, the color television receiver of FIG. 1 may be specifically constructed with any of the video peaking networks disclosed in the aforenoted patents, and without any substantial modification of the connections illustrated in this receiver arrangement. However, in accordance with the present invention, a video de-peaking circuit is further employed to automatically vary the accentuated luminance amplifier response as a function of the developed AGC voltage. For this reason, an additional connection is shown in the receiver arrangement of FIG. 1, for coupling the AGC voltage developed by the unit 19 to the luminance amplifier 14 for controllably varying, in the manner to be described below, the degree of high frequency loading of the final video amplifier stage so as to automatically de-peak the accentuated video response as an inverse function of received signal strength.

Figure 2:
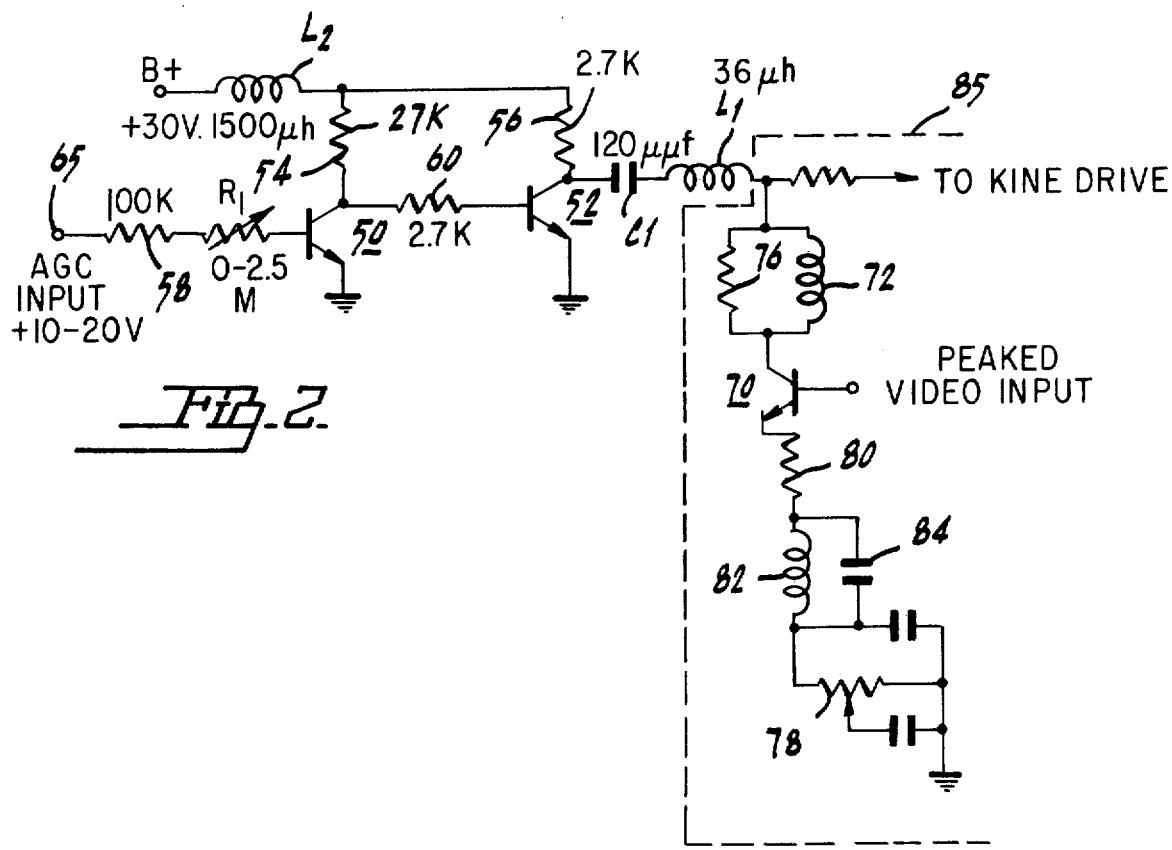
FIG. 2 is a simplified schematic circuit diagram of a portion of a video amplifier in accordance with the invention, illustrating the manner in which the video response is automatically and variably controlled as a function of AGC voltage.

A circuit embodying one form of the present invention is shown in FIG. 2 as comprising a two stage direct coupled amplifier. The amplifier includes a pair of transistors 50, 52 and four resistors 54, 56, 58, 60. As shown, the emitter electrodes of the transistors 50, 52 are each connected to a point of reference or ground potential while the collector electrodes are returned to a source of operating potential B+ by means of a decoupling choke $L_2$, with the collector electrode of transistor 50 being returned to the B+ source by means of the resistor 54 and with the collector electrode of transistor 52 being returned to the source by means of the resistor 56. The base electrode of transistor 50 is coupled to a point 65 at which the AGC voltage is developed, by means of the resistor 58, while the corresponding base electrode of transistor 52 is coupled by the remaining resistor 60 to the collector electrode of transistor 50. A variable resistor $R_1$ is serially connected in the base electrode lead of the transistor 50 to set the operating current of transistor 50.

The final video amplifier or output stage of the television receiver is represented by the transistor 70 within the dotted box 85, having a collector electrode coupled to the kinescope drive circuits—for example, by a winding 72 of an output transformer across which a resistor 76 is coupled.

The emitter electrode of transistor 70 is coupled to a contrast control potentiometer 78 via a resistor 80 and a 3.58mHz trap circuit including inductor 82 and capacitor 84, while the base electrode of transistor 70 is supplied with the video signals already accentuated by any suitable peaking circuit (not shown). The de-peaking circuit for controlling the accentuation of the video response in accordance with the amplitude of the received television signal is illustrated by the series connection of a capacitor $C_1$ and inductor $L_1$ connected between the collector electrode of transistor 52 and the end of transformer winding 72 remote from the collector electrode of transistor 70.

As was previously mentioned, this two-stage amplifier operates as a variable resistance to control the impedance of the ground return for the de-peaking circuit $L_1$, $C_1$. Thus, as received signal stength decreases—thereby causing a decrease in the developed AGC voltage in the usual manner—the drop in positive direct voltage applied to terminal 65 causes a decrease in the base electrode current of transistor 50 and a corresponding decrease in the current flow through resistor 54. The resulting increase in base current of transistor 52 causes a corresponding increase in the collector current flowing through resistor 56, and lowers the collector electrode-emitter electrode resistance of transistor 52. As will be apparent, this action decreases the resistance of the ground return path for the video de-peaking circuit $L_1$, $C_1$ and, with capacitor $C_1$ and inductor $L_1$ selected to pass the higher video frequencies, causes a reduction of the high frequency component of the luminance signal due to the increased loading of the transistor 70.

When the received signal strength increases, on the other hand, the opposite effect will be seen to occur. That is, the increasing AGC voltage at terminal 65 will cause the resistance of the ground return for the video de-peaking circuit through the collector electrode-emitter electrode resistance of transistor 52 to increase, and will lessen the high frequency loading of the circuit $L_1$, $C_1$. Depending upon the amount of signal increase, the degree of de-peaking will vary accordingly. With such arrangement, therefore, the disclosed circuit provides the desired automatic de-peaking of the accentuated video response during the reception of relatively weak signals—to lessen the visual "harshness" of the video noise. Conversely, the video peaking is returned to its normal value during the reception of stronger signals, to provide the high resolution picture usually warranted under such conditions of greater signal-to-noise ratio. This controlled operation thus parallels the workings of the sharpness control in previous receiver designs, but represents a significant improvement in that its performance is controlled automatically rather than manually. Such control could therefore be replaced in future designs without deleteriously affecting the resultant image display.

The schematic diagram of FIG. 3 illustrates the video amplifier circuitry employed in the CTC 44 color television receiver described in the 1970 publication of the RCA Sales Corporation under the designation "FILE 1970, No. T15". Such circuitry was employed in testing the video de-peaking circuit of FIG. 2, and illustrated the advantages which automatic de-peaking as an inverse function of received signal strength affords. As will be seen, the video output stage 90 corresponds to that shown in the dotted box 85 of FIG. 2, as including a transistor 99 and a 3.58mHz trap circuit comprising inductor 100 and capacitor 101 to minimize interference patterns generated by the mixing of chrominance frequencies with the high frequency video information. The contrast control potentio-meter 102 serves to vary the amount of series emitter resistance that is alternating current (AC) bypassed by a capacitor 103 to control the AC degeneration and result in gain control.

The first video amplifier stage 91 includes a transistor 104 having a base electrode coupled in series with the output of the second detector of the receiver 98, with the bias being provided by a voltage dividing network consisting of resistors 105, 106. The collector electrode of transistor 104 is coupled to the B+ supply by a resistor 107 which limits the maximum power for transistor 104 to dissipate. The collector electrode of transistor 104 is additionally AC bypassed to ground by a capacitor 108 which minimizes the effect of internal base-collector capacitance on the detector circuit. This amplifier stage 91 functions as an emitter follower, to effectively match the relatively high output impedance of the detector circuit with its characteristically high input impedance. Being an emitter follower stage, the first video amplifier output load comprises a resistor 109 coupled between the emitter electrode of transistor 104 and ground.

The signal output of the first video amplifier 91 is coupled to a delay line 110 via a resistor 111 which, in combination with the ouput impedance of the amplifier transistor 104, matches the characteristic input terminal impedance of the delay line 110 at the video frequencies. The output of the delay line 110 is coupled to a second video amplifier transistor 115 through a resistor 112, selected in combination with the AC input impedance of transistor 115 to match the characteristic output terminal impedance of the delay line 110. Inductors 113 and 114—which respectively couple the first video amplifier to the resistor 111 and the delay line 110 to the resistor 112—are selected to provide an optimum match for the reactive component of the delay line.

The second video amplifier stage 92 includes the transistor 115 connected in a common base configuration to provide an AC input impedance of zero ohms. This is achieved by bypassing the video signals to ground through a large capacitor 116 coupled to the base electrode of transistor 115. A resistor 117 couples the collector electrode of transistor 115 to the B+ supply, and serves as the load across which the output of the second video amplifier stage is developed. The operating point of the transistor 115 is varied by a brightness control potentiometer 118 serially coupled to the emitter electrode of transistor 115 by resistors 119–121. The resistor 119 closest to the emitter electrode serves to limit the direct current (DC) loading of the brightness control circuit on transistor 115, while the resistor 120 serves to dampen the brightness control lead inductance to prevent ringing due to low frequency video transients. A capacitor 122 is coupled between the junctions of resistors 119 and 120 and the ground potential point to provide a bypass for high video frequencies which might otherwise radiate from the brightness control lead while a further capacitor 123 cooperates with resistor 121 to function as a brightness control noise filter. A resistor 124 is further coupled to the emitter electrode of transistor 115 to apply vertical scanning rate pulses of positive polarity to provide vertical retrace blanking. A brightness limiter circuit (not shown) may also be coupled to the base electrode of transistor 115 to maintain picture tube beam current within proper limits, as described in the above-noted RCA publication.

A third video amplifier stage 93 includes a transistor 125 arranged in a common emitter configuration, with the video signal developed across resistor 117 being coupled to the base electrode of transistor 125 via a resistor 126. This resistor 126 optimizes the loading on the collector circuit of transistor 115 and provides a proper match between the stages 92, 93. At the same time, it also prevents saturation of the third video amplifier transistor 125 in the event the second video stage develops a collector-emitter or emitter-ground short circuit. A capacitor 127 is coupled across resistor 126 to minimize the effects of the internal feedback capacity of transistor 125 on the overall video response.

The emitter electrode of transistor 125 is returned to the source of B+ potential by a DC stabilization resistor 128, which is bypassed to ground by a capacitor 129. These two components, in conjunction with resistor 126, capacitor 127 and the effective input capacity of transistor 125, determine the basic response characteristics of the video system. The output signal of the third video amplifier stage 93 is developed across a resistor 130 coupled between the collector electrode of transistor 125 and ground, for direct coupling to the input of a fourth video amplifier stage 94.

Such fourth stage employs a transistor 131 arranged as an emitter follower amplifier with its output appearance across a resistor 132 coupled between the emitter electrode of transistor 131 and ground. The positive bias applied to the collector electrode of the transistor is supplied from the B+ source through a filter network including resistor 97 and capacitor 133 which de-couple the amplifier from the chassis supply. Such de-coupled voltage also serves as the B+ supply voltage for the collector electrode of the second video amplifier stage transistor 115 and for the emitter electrode of the third video amplifier transistor 125. Horizontal scanning rate pulses which are coincidental with the horizontal retrace interval are applied to the base electrode of transistor 131 via a resistor 134 to accomplish horizontal retrace blanking. Such resistor also prevents excessive reverse current flow in the base-emitter junction during the horizontal interval.

A negative DC feedback network including resistors 135, 136 is coupled from the fourth video amplifier load resistor 132 to the emitter electrode of the second video amplifier transistor 115. Changes in the average electron current flow through the fourth transistor 131 thus develops a proportional voltage change across its load resistor 132 which is coupled back to the emitter electrode of transistor 115 by the feedback network 135, 136 to change the amplifier's average conduction in the direction to cancel the changes developed across resistor 132. As indicated, the emitter electrode of transistor 131 is directly coupled to the base electrode of the video output transistor 99.

A video peaking circuit is also shown, together with its manually adjustable sharpness control. Such circuit includes the series combination of a capacitor 137, an inductor 138 and the control potentiometer 139 serially coupled between the junction of resistors 135 and 136 and the point of ground potential. Such circuit not only accentuates the high video frequencies but increases the transient response of the video system, as well.

The output loading circuit of the video output stage 90 is also similar to that shown in FIG. 2. In particular, the output signal is developed across a voltage divider network including a resistor 140, three drive control 141-143 (for the red, green and blue kinescope cathodes) and a resistor 144. The two windings 145, 146 of a transformer 147 are mutually coupled so as to provide additional high frequency peaking across the voltage divider network. These windings couple the network between the collector electrode of the video output transistor 99 and a source of direct voltage $+V_1$. As indicated in FIG. 3, the end of winding 145 remote from the collector electrode of the transistor 99 is connected to inductor $L_1$ of the de-peaking circuit of FIG. 2 for provision of the variable resistance function there described.

The schematic diagram of FIG. 3 also shows that part of the receiver circuitry which functions to provide the positive AGC voltage used to control the variable resistance of the de-peaking circuit. As shown, a gated AGC amplifier 95 includes a transistor 150 having its base electrode coupled to the emitter electrode of the first video amplifier transistor 104 via a resistor 151. Video information with positive-going sync pulses is thus applied to the base electrode of transistor 150, which is made to conduct only during the sync pulse interval by positive-going "keying" pulses coupled to the collector electrode of transistor 150 by means of a capacitor 152. A voltage divider network including resistors 153, 154 is coupled between a point of $+V_2$ potential and ground to provide the operating bias for the transistor 150, with the junction between resistors 153, 154 being bypassed to ground by capacitor 155. When the keying pulses turn transistor 150 "ON" simultaneously with the horizontal sync pulses contained in the video information applied to its base electrode, the bias so provided allows the base-emitter junction to become forward biased only during the positive peaks of the sync pulse to optimize the noise immunity of the amplifier. The electron current flow at this time from the emitter electrode to the collector electrode of transistor 150 leaves a negative charge on a capacitor 156 coupled between the collector electrode of transistor 150 and ground. This negative voltage is proportional to the amount of amplifier conduction, and is representative of applied signal strength as it is determined by the peak positive amplitude of the incoming sync pulses.

A resistor 167 and capacitor 168 are serially coupled across capacitor 156 to improve the stability of the AGC system. A semiconductor diode 169 is placed in series between the collector electrode of transistor 150 and capacitor 156, and of polarity to prevent the developed negative voltage from discharging back through the collector-base junction of transistor 150 between keying pulses. The voltage developed is a negative AGC voltage, and thus is to be inverted for use with the transistor polarities of the video de-peaking circuit of the invention. For opposite transistor polarities, such negative AGC voltage could be used.

Thus, the configuration of FIG. 3 includes an AGC inverter stage 96 having a transistor 170 biased at its base electrode by a voltage divider network including resistors 171, 172 and 173. As shown, resistor 172 couples a source of positive voltage $+V_3$ to the base electrode of transistor 170 through the resistor 171, but under the control of the resistor 173, made variable to establish the proper proportions of the AGC voltage applied to the RF and IF amplifiers throughout the AGC control range and to set the point at which the AGC voltage begins to reduce the RF amplifier gain. Operating potential $+V_4$ for transistor 170 is coupled to its collector electrode by a pair of serially coupled resistors 174, 175, with the junction between these resistors being coupled by a resistor 182 both to the IF amplifiers and to terminal 65 of the FIG. 2 de-peaking circuit. A feedback resistor 177 is also coupled between the collector and base electrodes of transistor 170, and is shunted by a capacitor 178, as is the noise control resistor 173, by means of a capacitor 179. Lastly, a resistor 180 couples the base electrode of transistor 170 to receive the negative AGC voltage developed across capacitor 156, while a resistor 181 is included to couple such negative voltage ultimately to the RF amplifiers.

Although the described FIG. 3 circuit shows a manual sharpness control 139 to provide the customer with a means to vary the degree of video peaking achieved by the circuitry 137-139, operation of the FIG. 3 arrangement should continue without significant deleterious effects, by omitting such control in view of the parallel performance exhibited by the de-peaking circuit of the invention. Such control could still be used with the de-peaking circuit, however, to vary the reproduced image for a given signal condition according to individual taste preferences.

While there has been described what is considered to be a preferred embodiment of the present invention, it will be readily apparent that modifications may be made by those skilled in the art without departing from its teachings. Thus, it is contemplated that the scope of the invention be read in accordance with the appended claims.

What is claimed is:

1. In a color television receiver of the type including signal translating stages for processing radio frequency and intermediate frequency signals, a luminance channel for processing luminance signals, a chrominance channel for processing chrominance signals, an image reproducing kinescope, an output stage coupled between said luminance channel and said image reproducing kinescope and apparatus for developing an AGC voltage to control the gain of said signal translating stages as an inverse function of the amplitude of a received signal, said luminance channel including a peaking circuit for accentuating high frequency components of said luminance signals, the combination therewith of:

means coupled intermediate said luminance channel peaking circuit and said kinescope at said output stage and being also responsive to said AGC voltage but for automatically de-emphasizing said accentuated high frequency components of said luminance signals, also as an inverse function of said received signal amplitude;

said means being independently operative of said peaking circuit and so configured and arranged that the degree of de-emphasis provided said accentuated high frequency components of said luminance signals increases with decreases in received strength to reduce the presence of higher frequency noise in a reproduced image under weak signal conditions while the degree of de-emphasis provided said accentuated high frequency components of said luminance signals decreases with increases in received signal strength where the signal-to-noise ratio of an incoming signal is correspondingly greater;

said means including an impedance path for bypassing said accentuated high frequency components of said luminance signals away from said image reproducing kinescope, said AGC varying the impedance of said path in the same direction as variations in said received signal strength, said impedance path comprising the series connection of a capacitive and inductive reactance and a variable resistance, said capacitive and inductive reactance being selected so as to pass said accentuated high frequency components of said luminance signals with said resistance being controllably varied in the same direction as variations in said AGC voltage to change the loading of said output stage in the frequency range of said high frequency components of said luminance signals, also as an inverse function of received signal strength.

2. The combination of claim 1 wherein said variable resistance includes a transistor having an internal impedance which is controlled in response to said AGC voltage to increasingly bypass said high frequency components of said luminance signals as said received signal strength decreases.

* * * * *